United States Patent [19]
Steudler, Jr.

[11] 3,804,068
[45] Apr. 16, 1974

[54] WATER FOUNTAIN

[75] Inventor: Frederick W. Steudler, Jr., Lancaster, Pa.

[73] Assignee: Vallorbs Jewel Company, Lancaster, Pa.

[22] Filed: Feb. 29, 1972

[21] Appl. No.: 230,388

[52] U.S. Cl. .............................................. 119/81
[51] Int. Cl. ............................................ A01k 07/00
[58] Field of Search ....... 119/81, 75, 72.5; 137/408; 251/145, 146

[56] References Cited
UNITED STATES PATENTS

| | | | |
|---|---|---|---|
| 242,564 | 6/1881 | Sholder | 285/360 X |
| 2,295,964 | 9/1942 | Null | 119/81 |
| 2,541,369 | 2/1951 | Kofford | 119/75 X |
| 1,549,858 | 8/1925 | Evans | 285/361 X |
| 2,241,773 | 5/1941 | Ernolf | 285/360 X |
| 3,538,950 | 11/1970 | Porteners | 285/376 X |
| 2,752,935 | 7/1956 | Keyser | 119/81 X |
| 3,092,078 | 6/1963 | Goswick | 119/81 |

Primary Examiner—Hugh R. Chamblee
Attorney, Agent, or Firm—Diller, Brown, Ramik & Wight

[57] ABSTRACT

This disclosure relates to a novel water fountain for poultry or other animals, the water fountain including a support member adapted to be suspendingly supported in a generally upright position with valve means in an axial opening or bore for controlling the flow of water therethrough, a cup assembly carried by the support member and support means in the form of a sleeve telescopically receiving a rod of the cup assembly with means for biasing the latter toward the valve for operating the valve in response to the weight of water in the cup, and means between the sleeve and the support member for axially stepwise adjusting the sleeve relative to the rod whereby the force of the biasing means may be regulated to correspondingly vary the operation of the valve for desired different weights of water in the cup. The stepwise adjustment is effected by a plurality of axially spaced circumferentially offset lands on the support member and a radially outwardly directed lug on the sleeve with each land opposing an axially spaced and aligned valley which automatically aligns the lug with each land upon relative rotation between the sleeve and the support member.

25 Claims, 8 Drawing Figures

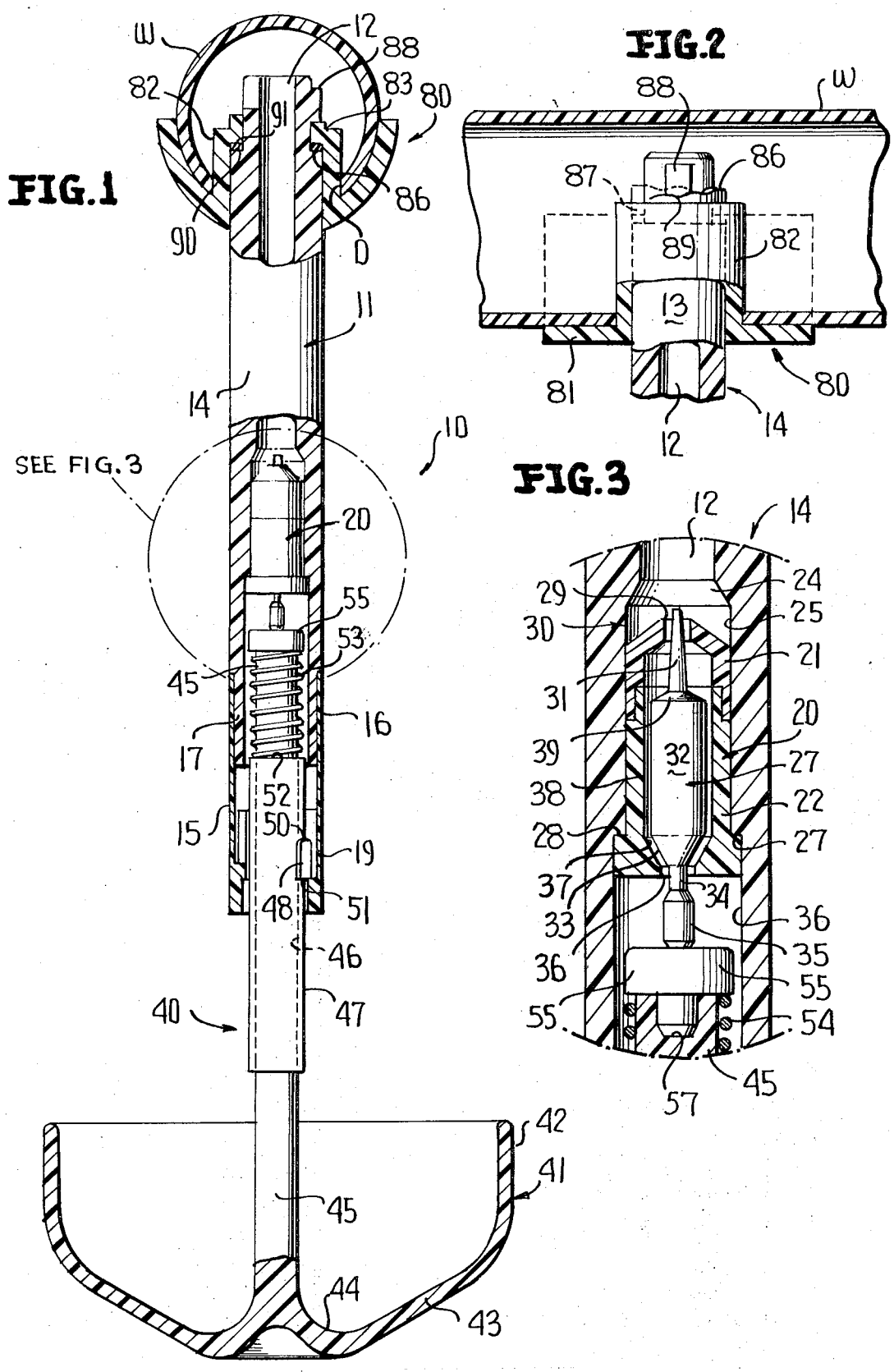

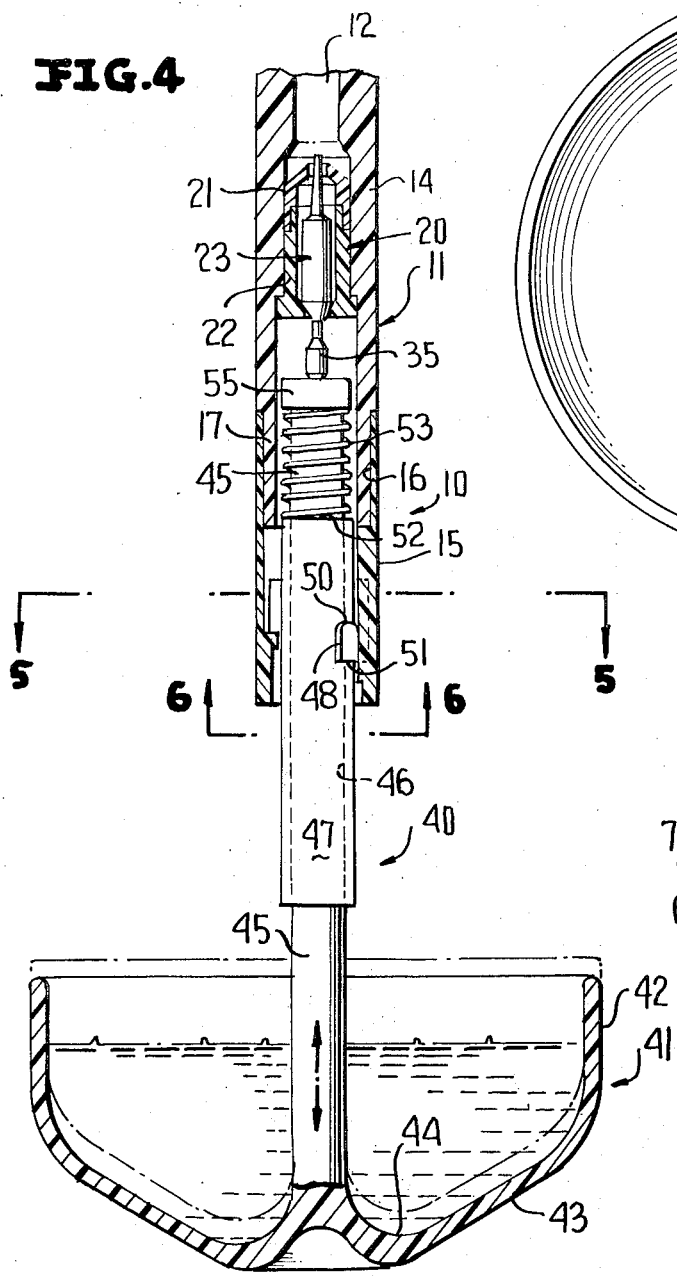
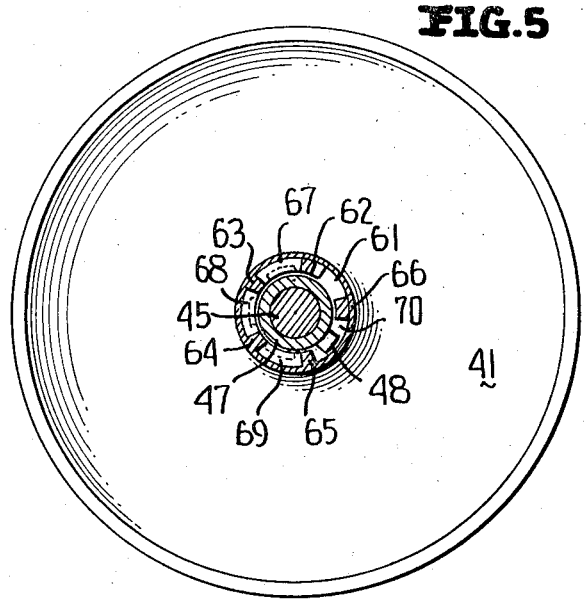
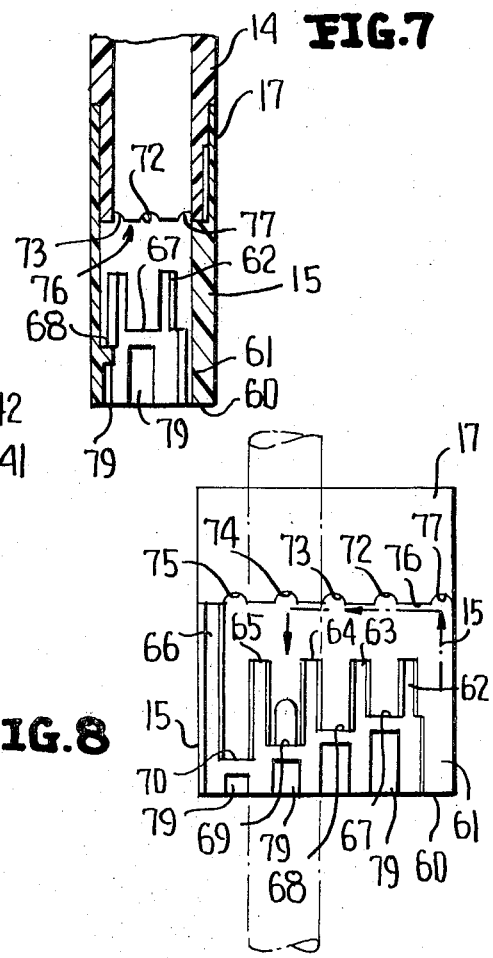
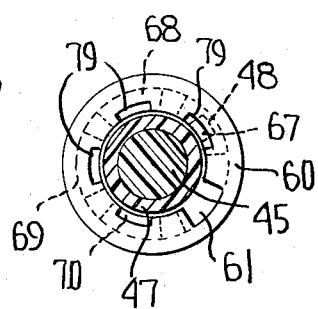

WATER FOUNTAIN

This invention is directed to water or drinking fountains particularly adapted for feeding poultry as, for example, chickens, ducks, etc., from infancy to maturity. The water fountain is a part of an overall watering system designed for mass watering of poultry or other animals, and though the overall watering system forms no part of the present invention, reference may be made thereto in application Ser. No. 246,989, filed on even date herewith, entitled WATER FOUNTAIN SYSTEM, in the name of Frederick W. Steudler, Jr., and commonly assigned to the assignee of the present application.

Conventional water fountains of the suspension type, to which this invention is directed, are relatively well known but for the most part are highly suspect from the standpoint of operability and longevity. However, in most cases the initial concern is the expense involved in manufacturing and thus purchasing conventional water fountains due to intricate and, more often than not, ill thought out constructions. Most conventional water fountains are not resistant to corrosion and are readily rendered inoperable thereby, as well as by simply clogging due to water impurities, dirt or other impurities introduced into the system by the activities of the animals involved. In view of this, most conventional water fountains lack dependability, reliability, etc., and without the latter the use of such water fountains on a mass scale would be prohibitive, if not suicidal.

Since each water fountain is part of an overall mass watering system, it must be rapidly coupled to conventional water pipes or uncoupled therefrom, and here again the prior art is lacking in structure which must necessarily operate with rapidity and reliability, as well as without leakage. In accordance with the present invention, novel coupling means are provided which not only assure that each water fountain can be rapidly coupled or uncoupled to an associated water pipe, but each coupling means includes structure for varying sealing forces to compress a sealing gasket within a range of forces to accommodate variations in tolerances of the system.

Finally, most conventional water fountains of the suspension type are fed water to a reservoir, cup or the like in response to animal demand or more precisely in response to the weight of water in each cup. Depending upon the number, size and age of animals to be watered per water fountain, a particular water level is desired to be maintained in order to balance as efficiently as possible water which is actually consumed by the animals and water which is wasted through spillage and evaporation. If adjustment cannot be regulated accurately and dependably for each water fountain, then spillage and/or evaporation will occur with inordinate and undesired rapidity. However, in keeping with the present invention, the water fountain is provided with means responsive to demand which ooperate accurately and reliably, the same occurring due to the inability of the same being rendered inoperative by corrosion, dirt or similar deleterious matter.

In view of the foregoing, it is a primary object of this invention to provide a novel water fountain which overcomes the earlier described and other disadvantages of conventional fountains, and structurally includes a support member adapted to be suspendingly supported with a gravity actuated valve being housed in an axial bore or opening thereof for controlling the flow of water to a cup or similar reservoir, the cup is a portion of a cup assembly supported by a rod telescopically received through a sleeve which in turn is received in the axial bore of the support member, means are provided between the sleeve and the rod for biasing an end of the latter toward the valve for operating the valve in response to the weight of water in the cup, and means are provided between the sleeve and the support member for axially stepwise adjusting the sleeve relative to the rod whereby the force of the biasing means may be regulated to correspondingly vary the operation of the valve for desired different weights of water in the cup.

A further object of this invention is to provide a novel water fountain of the type described wherein the stepwise actuating means is defined by a plurality of axially spaced circumferentially offset lands on the support member and a radially outwardly directed lug on the sleeve selectively engageable with the offset lands.

Still another object of this invention is to provide a novel water fountain of the type heretofore described wherein the valve is housed in a valve chamber, and an exterior peripheral wall of the valve housing and the bore of the support member define an annular chamber in which is received material which might otherwise tend to clog the valve and into which such material may be displaced by a movement of the valve.

Yet another object of this invention is to provide a novel water fountain of the type described including means in axially aligned opposed spaced relationship to each land for automatically aligning the lug with each land upon relative rotation between the sleeve and the support member to accurately control the weight of water dispensed by the valve to the cup.

Still another object of this invention is to provide a novel water fountain of the type described wherein the support member is of at least a two part construction, one of the two parts carrying the lands, and the other of the two parts carrying the aligning means.

Still another object of this invention is to provide in conjunction with any water fountain assembly of the type including a tubular support member having an axial opening therein and first and second opposite end portions adapted for respectively movably supporting a valve regulated water cup assembly and coupling the support member to a water pipe, the improvement of coupling means for coupling the second end portion of the support member to the water pipe, the coupling means including a radially outwardly projection carried by the second end portion, an annular wall of the second end portion axially spaced from and facing the projection, a sleeve adapted for connection to the water pipe, the sleeve having axially oppositely facing annular walls, a first wall of the sleeve being in opposed relationship to the second wall of the second end portion, the projection resting atop a second wall of the sleeve, and the sleeve second wall being defined by alternating peaks and valleys inclined circumferentially of the sleeve whereby upon relative rotation of the sleeve and support member the same are moved axially to tighten or loosen the coupling force therebetween.

A further object of this invention is to provide an improvement in a combination of the type immediately heretofore set forth including gasket means between the sleeve first wall and the second end portion second wall which is compressed or relaxed upon respective tightening and loosening of the coupling force.

With the above and other objects in view that will hereinafter appear, the nature of the invention will be more clearly understood by reference to the following detailed description, the appended claimed subject matter, and the several views illustrated in the accompanying drawings.

IN THE DRAWINGS:

FIG. 1 is a fragmentary side elevational view of a novel water fountain of this invention with portions thereof broken away and shown in section for clarity, and illustrates an upwardly spring biased rod supporting a cup for operating a valve to deliver water to the cup dependent upon the biasing force of a spring adjusted by the position of a lug carried by a sleeve embracing the rod relative to any one of a number of lands of the support member.

FIG. 2 is an axial sectional view taken through a conventional watering pipe looking from right-to-left in FIG. 1, and illustrates the manner in which the water fountain is coupled to the pipe.

FIG. 3 is a highly enlarged sectional view of the encircled portion of FIG. 1, and illustrates in cross section the valve and its associated valve housing.

FIG. 4 is a fragmentary view of the water fountain similar to FIG. 1 but illustrating the valve in its closed position due to the weight of water holding the cup in the solid outline position thereof.

FIG. 5 is a sectional view taken generally along line 5—5 of FIG. 4, and illustrates four lands of the support member upon one of which rests the lug of the sleeve to preload the spring as desired to regulate the water level of the cup.

FIG. 6 is a sectional view taken generally along line 6—6 of FIG. 4, and illustrates an axial groove through which the lug of the sleeve may be moved for assembling the sleeve to the support member and upon any one of the four lands thereof.

FIG. 7 is a fragmentary axial sectional view taken through the lower end of the support member after the cup assembly has been removed therefrom, and more clearly illustrates a plurality of the lands with each land being axially aligned and spaced from an opposing valley which functions to automatically align the lug with a particular land during the rotation of the sleeve.

FIG. 8 is a developed view of the lower end portion of the support member, and illustrates the manner in which the lug of the sleeve may be moved to different ones of the lands to adjust the force of the valve biasing spring.

A novel water fountain constructed in accordance with this invention is generally designated by the reference numeral 10, and in FIG. 1 is drawn to a scale of two to one. The water fountain 10 includes a stem assembly or support member 11 which is suspendingly supported in a generally upright position from a water pipe W in a manner to be described more fully hereinafter. The support member 11 includes an axial bore or opening 12 extending the length thereof between opposite end portions 13, 19. The support member 11 is preferably constructed from two parts 14, 15 with the latter having an inner surface 16 corresponding in size to the exterior dimension of a reduced end portion 17 of the part 14. Preferably the parts 14, 15 are constructed from medium impact plastic material and are spun welded or otherwise secured to each other after a valve housing 20 formed of two parts 21, 22 (FIG. 3) and a two-way valve 23 have been housed within the bore 12.

Referring particularly to FIG. 3 of the drawings, the bore or axial opening 12 of the stem assembly 11 includes a frusto-conical surface 24 merging with a cylindrical counterbore surface 25 which is in turn counterboard at 26. Between the counterbores 25, 26 is an annular shoulder 27 which functions as a stop for contacting an annular flange 28 of the valve housing part 22 to limit upward movement of the valve housing 20 within the counterbore 25. The housing 25 is, of course, not seated in the position shown in FIG. 3 until the valve 23 has been housed therein after which the parts 21, 20 which are preferably constructed from polyvinyl chloride are ultrasonically or otherwise secured to each other. The housing 20 is preferably force fitted to the bore 25 but due to the abutment between the annular shoulder 27 and the flange 28 an annular chamber 30 is formed between an exterior peripheral frusto-conical wall of the part 21 and the radially adjacent portion of the counterbore 25. The annular chamber 30 serves as an area for collecting dirt, grit, corrosion, etc. which is too large to enter the valve passage between a bore 29 of the housing 20 and a frusto-conical end 31 of the valve 23.

The valve 23 is one of two parts of the water fountain constructed from metallic material, and is preferably 303 A.S.A. stainless steel. The valve 23 includes the frusto-conical end 31 heretofore noted which projects through the bore 29 of the housing 20 in both the open and closed positions of the valve 23, another frusto-conical portion 39, main cylindrical portion 32 beneath which is a frusto-conical portion 33 joined by a cylindrical neck 34 to an enlarged lower end portion 35, with the neck 34 and the lower end portion 35 passing through a bore 36. There is a valve seat (unnumbered) formed by a 0.0020 inch flat between the portions 36, 37 against which the surface 33 will seat in the lowermost portion of the valve 23. In order to permit solid material to pass through the passage (unnumbered) between the valve 23 and the housing 20, the present invention utilizes what might be best termed a "floating" valve arrangement due to the relative dimensioning between the narrowest end of the valve portion 31 with respect to the bore 29 (0.028 inch to 0.026 inch, respectively), like relative dimensioning between the main portion 32 and the bore 38 (0.0785 inch to 0.094 inch, respectively), and like relative dimensioning between the cylindrical end 35 and the bore 34 (0.042 inch to 0.067 inch, respectively). This permits ample clearance for any material which is small enough to enter the valve between surfaces 29, 31 to pass through the passage between the housing 20 and the valve 23 when the latter is in the open position (FIG. 3). Moreover, in the closed position this clearance in no way affects the sealing relationship between the surface and the flat between the surfaces 36, 37. However, even should the valve become clogged due to heavy dirt or grit which does not automatically enter the chamber 30 shaking or axial movement applied to the valve 23 will displace such material and/or dislodge such material particularly if it is atop the part 21 and cause the same to be discarded in the annular chamber 30.

Referring particularly to FIGS. 1 and 4, a cup assembly of the water fountain is generally designated by the reference numeral 40 and includes a cup 41 having a cylindrical upper portion 42, a frusto-conical wall 43 and a rounded radius 44 merging with and joined to a rod 45 which may be formed as an integral part of the cup 41 by an injection molding operation since the cup and rod are preferably constructed from medium impact polymeric material. However, irrespective of the integral construction of the cup 41 and the rod 45, or the separate formation thereof, the rounded radius 44 presents a smooth interior surface along which dirt will flow away from the rod 45 toward the wall 43 and is thereby more readily accessible to feeding animals and will thus be maintained clean by the animals by their licking, lapping, picking, etc.

The rod 45 is telescopically introduced into and through an axial opening or bore 46 of an adjusting insert or sleeve 47 having a radially outwardly directed lug 48 whose upper surface is rounded at 50 and whose lower surface is flattened as at 51. The sleeve 47 terminates in an annular axially facing face or wall 52 upon which rests a spring 53 sandwiched between the face 52 and an undersurface 54 of a cap 55 (FIG. 3) having a boss 56 received in and bonded to a bore 57 of the rod 45.

Reference is now made specifically to FIGS. 6, 7 and 8 of the drawings, and particularly with respect to the latter, which is a developed view of the interior of the part 15 and the reduced end portion 17 of the part 14 of the stem assembly 11. The part 15 includes a lower axial face 60 which opens an axial slot or groove 61 having a width sufficient to accommodate the lug 48. As viewed from right to left in FIG. 8, the inner surface of the part 15 defines in order four axially upwardly projecting peaks or ribs 62 through 65 of equal height and a final higher rib or peak 66. Between the peaks 62 through 66 are respective ledges or lands 67 through 70. In axially aligned spaced relationship with the lands 67 through 70 are respective arcuate valleys 72 through 75 formed in an annular axial end wall or face 76 of the part 14. Another arcuate valley 77 is in axially aligned spaced relationship to the groove 61. The distance between the axial face 76 and the upper surfaces (unnumbered) of the peaks 62 through 65 is greater than the axial height of the lug 48 between the flat undersurface 51 thereof and the peak of the curved upper surface 50.

The cup assembly is joined to the stem assembly 11 by aligning the lug 48 of the sleeve 47 with the groove 61 and the part 17 and moving the sleeve 47 and the stem assembly 11 axially to introduce the lug 48 to a position at which its rounded surface 50 enters the valley 77 of the part 17. The sleeve 47 is next rotated relative to the part 17 since further axial movement is precluded by the abutment between the surface 50 of the lug 48 and the axially opposing surface of the valley 77. This interlock of the surface 50 and the valley 77 can be sensed or felt because the radiuses are alike and thereby indicates to the operator that the next operation in assembling the components is one of relative rotation between the sleeve 47 and the stem assembly 11. Rotation in one direction is precluded by the peak or rib 66 while rotation toward the next valley 72 is permitted since, as was heretofore noted, the distance between the annular face 76 and the upper surfaces of the peaks 62 through 65 is greater than the height of the lug 48 between the surfaces 50, 51 thereof. Accordingly, the stem 47 is rotated with the surface 50 moving along the axial face 76 of the part 17, and as it moves therealong it can progressively drop into the valleys 72 through 75 indicating to the operator that the lug is in alignment with the respective lands 67 through 70. Assuming, for example, that the operator desires to have the lug 48 seated upon the land 67 he need only move the sleeve as indicated by the unnumbered headed arrows in FIG. 8 and by "feeling" the valleys 77, 72, 73 and 74, in sequence he will then release the sleeve 47 and the spring 53 will force the same downwardly whereupon the lug 48 will be received in and seated upon the land 69. In this manner the lug 48 and the lands 67 through 70 maintain the cup assembly 40 in assembled relationship with the stem assembly 11. More importantly, however, is the fact that due to the sandwiched relationship of the spring 53 between the cap 55 of the rod 45 and the upper face 52 of the sleeve 47 the lug 48 and the lands 67 through 70 serve to adjust the biasing force of the spring 53 and thus the amount of water by weight necessary to close the valve 23 which is, of course, held normally open by the spring 53. For example, if the lug 48 rests upon the land 70, the spring 53 is under least compression applying the least opening force against the valve 23 through the cap 55 thereby requiring the least weight of water in the cup 41 to close the valve 23. Thus, with the lug 48 resting upon the land 70, the height of the water in the cup 41 will be maintained at a minimum whereas with the lug 48 seated upon the land 67 the spring 53 exerts its greatest force against the valve 23 necessitating the maximum amount of water weightwise and, of course, level-wise in the cup 41 before the valve 23 is closed.

As was heretofore noted, the valve 23 is a two-way valve with the closing action being dependent upon the weight of water in the cup 41 whereupon the frusto-conical portion 33 of the valve 23 will seat upon the flat (unnumbered) between the surfaces 36, 37. While the precise closing action dependent upon the water within the cup 41 is important, just as important is the necessity of the valve 23 being closed when a feeding animal lifts the cup 41 upwardly. In conventional fountains, feeding animals have been known to instead simply lift the fountain caps with their heads, necks, etc. to open the valve thereof causing water to continuously flow, overflow the cup, and moisten the animal refuse which is highly undesirable. The wetting of animal refuse causes difficulties in cleaning as well as disposal thereof. However, in accordance with the present invention, upward movement of the cup 41 by an animal will unseat the valve 23 but the throw (axial movement between both seated positions) is so small that an animal finds it virtually impossible to hold the cup at a position whereat the lower flat is not in contact with the conical portion 33 and the other valve portion 39 is not in contact with the overlying unnumbered valve seat immediately below the bore 29. The fountain 10 is thus rendered animal-foolproof since excessive upward movement of the valve 23 closes the passage by the portion 39 seating upon the overlying unnumbered frusto-conical valve seat whereas downward movement results in the closing of the valve with the portion 33 seated upon the flat (unnumbered) between the surfaces 36, 37.

Another problem encountered with conventional water fountains is the tendency of calcium deposits to build-up causing passage closure and jamming. In accordance with the present invention a recess 79 is positioned beneath each of the lands 67 through 70, as is best illustrated in FIGS. 6 to 8 of the drawings. The recesses or grooves 79 break up calcium deposit build-up between the radially innermost edge of the face 60 and the outer surface of the sleeve 47 thereby imparting longevity of operation to the fountain 10.

Referring specifically to FIGS. 1 and 2 of the drawings, the water fountain 10 is preferably connected to the water pipe W by novel coupling means generally designated by the reference numeral 80. The coupling means 80 includes a saddle-like portion 81 which may be adhesively secured to the water pipe W after a sleeve 82 thereof has been introduced through a circular opening O formed in the pipe W. The sleeve 82 includes a radially inwardly directed flange 83 having an inner cylindrical surface 84 and upwardly and downwardly oppositely facing axial walls or faces 85, 86, the former of which is of an undulating configuration progressively inclining upwardly in a circumferential direction from an axial slot 87 formed in the cylindrical surface 84 of a sufficient depth and width to freely axially pass therethrough a lug 88 of the end portion 13 of the stem assembly 11 which has a rounded surface 89 opposing the face 86 of the sleeve 82. The lug 88 is in axial spaced relationship to an annular wall or face 90 which receives in sandwiched relationship with the annular wall 86 and O-ring gasket or seal 91.

Assuming that the pipe W, the coupling means 80 and the stem assembly are in disassembled relationship, the same are assembled by first forming the opening O in the pipe W by simply drilling or boring the same in a conventional manner which can be quickly done since the pipe W is preferably constructed from plastic material. Thereafter, the seat or saddle 81 is adhesively secured to the pipe W with the sleeve 82 disposed interiorly thereof. The gasket 91 is next seated upon the shoulder or wall 90 of the end portion 13 and the end portion 13 is introduced axially into the sleeve 82 with the lug 88 in alignment with the slot 87. The lug passes through the slot and upon being rotated clockwise in FIG. 2 it will progressively ride upwardly along the surface 86 drawing the surfaces 86, 90 closer together thus compressing the gasket 91 and assuring not only a tight connection but a sealed connection with the undulations of the face 89 permitting the coupling forces to be varied as may be found necessary due to component tolerances.

While preferred forms and arrangements of parts have been shown in illustrating the invention, it is to be clearly understood that various changes in details and arrangement of parts may be made without departing from the spirit and scope of this disclosure.

I claim:

1. A water fountain comprising a support member adapted to be suspendedly supported in a generally upright position, an axial opening in at least one end portion of said support member, valve means in said opening for controlling the flow of water therethrough, a cup assembly carried by said support member, said cup assembly includes a cup for receiving water which flows past said valve means, means for supporting said cup assembly relative to said support member, said supporting means include a rod joined to said cup and telescopically received through a sleeve, means for biasing an end of the rod toward said valve means for operating said valve means in response to the weight of water in said cup, means between said sleeve and said support member for axially stepwise adjusting said sleeve sleeve relative to said rod whereby the force of the biasing means may be regulated to correspondingly vary the operation of said valve means for desired different weights of water in said cup, and said biasing means further biases said sleeve into axial engagement with said stepwise adjusting means of said support member.

2. The water fountain as defined in claim 1 wherein said stepwise adjusting means is defined by a plurality of axially spaced circumferentially offset lands on one of said sleeve and support member and a radially directed lug on the other of said sleeve and support member.

3. The water fountain as defined in claim 1 wherein said stepwise adjusting means is defined by a plurality of axially spaced circumferentially offset lands on said support member and a radially outwardly directed lug on said sleeve.

4. The water fountain as defined in claim 1 including means for coupling another end portion of said support member remote from said one end portion to a water pipe, and said axial opening extends through said another end portion.

5. The water fountain as defined in claim 2 including means in axially aligned opposed spaced relationship to each land for automatically aligning said lug with each land upon relative rotation between said sleeve and support member.

6. The water fountain as defined in claim 2 including means in axially aligned opposed spaced relationship to each land for automatically aligning said lug with each land upon relative rotation between said sleeve and support member, said support member being of at least a two part construction, one of said two parts carrying one of said lands or lugs, and the other of said two parts carrying said aligning means.

7. The water fountain as defined in claim 3 including means in axially aligned opposed spaced relationship to each land for automatically aligning said lug with each land upon relative rotation between said sleeve and support member.

8. The water fountain as defined in claim 2 including means in axially aligned opposed spaced relationship to each land for automatically aligning said lug with each land upon relative rotation between said sleeve and support member, said support member being of at least a two part construction, one of said two parts carrying one of said lands or lugs, and the other of said two parts carrying said aligning means, said support member being of at least a two part construction, one of said two parts carrying said lands, and the ohter of said two parts carrying said aligning means.

9. The water fountain as defined in claim 4 wherein said another end portion of said support member has a radially outwardly directed projection, said coupling means includes a sleeve adapted for insertion into a water pipe, said another end portion of said support member being in internal telescopic relationship to said coupling sleeve with said projection resting atop an annular end face of said coupling sleeve, and said annular end face being defined by alternating peaks and valleys inclined circumferentially of said coupling sleeve whereby upon relative rotation of said coupling sleeve and support member the same are moved axially to tighten or loosen the coupling force therebetween.

10. The water fountain as defined in claim 4 wherein said another end portion of said support member has a radially outwardly directed projection, said coupling means includes a sleeve adapted for insertion into a water pipe, said another end portion of said support member being in internal telescopic relationship to said coupling sleeve with said projection resting atop an annular end face of said coupling sleeve, said annular end face being defined by alternating peaks and valleys inclined circumferentially of said coupling sleeve whereby upon relative rotation of said coupling sleeve and support member the same are moved axially to tighten or loosen the coupling force therebetween, and gasket means between axially opposing annular walls of said coupling sleeve and support member which is compressed or relaxed upon respective tightening and loosening of the coupling force.

11. The water fountain as defined in claim 4 wherein said another end portion of said support member has a radially outwardly directed projection, said coupling means includes a sleeve adapted for insertion into a water pipe, said another end portion of said support member being in internal telescopic relationship to said coupling sleeve with said projection resting atop an annular end face of said coupling sleeve, said annular end face being defined by alternating peaks and valleys inclined circumferentially of said coupling sleeve whereby upon relative rotation of said coupling sleeve and support member the same are moved axially to tighten or loosen the coupling force therebetween, said coupling sleeve having a radially inwardly directed flange, and an axially extending radially inwardly opening slot is formed in said flange to effect the passage therethrough of said projection for coupling and uncoupling said support member and coupling sleeve.

12. The water fountain as defined in claim 4 wherein said another end portion of said support member has a radially outwardly directed projection, said coupling means includes a sleeve adapted for insertion into a water pipe, said another end portion of said support member being in internal telescopic relationship to said coupling sleeve with said projection resting atop an annular end face of said coupling sleeve, said annular end face being defined by alternating peaks and valleys inclined circumferentially of said coupling sleeve whereby upon relative rotation of said coupling sleeve and support member the same are moved axially to tighten or loosen the coupling force therebetween, gasket means between axially opposing annular walls of said coupling sleeve and support member which is compressed or relaxed upon respective tightening and loosening of the coupling force, said coupling sleeve having a radially inwardly directed flange, and an axially extending radially inwardly opening slot is formed in said flange to effect the passage therethrough of said projection for coupling and uncoupling said support member and coupling sleeve.

13. The water fountain as defined in claim 8 wherein said aligning means is a valley formed in said other part opposing each land of said one part.

14. The water fountain as defined in claim 8 wherein said other part is a sleeve having an axial annular end face in axially opposed relationship to said lands, and said aligning means is a valley formed in said other part end face opposing each land of said one part.

15. The water fountain as defined in claim 8 wherein circumferentially adjacent lands are separated by axially projecting peaks.

16. The water fountain as defined in claim 13 wherein circumferentially adjacent lands are separated by axially projecting peaks.

17. The water fountain as defined in claim 14 wherein circumferentially adjacent lands are separated by axially projecting peaks.

18. The water fountain as defined in claim 1 including means defining at least a two-piece valve housing having an interior cylindrical surface of a first predetermined diameter and smaller axially opposite bores, said valve means including a major cylindrical vlave body portion of a second predetermined diameter less than that of said first predetermined diameter and defining therewith a first annular chamber of a first predetermined radial dimension, said valve body portion having axially oppositely directed upper projecting first and lower projecting second ends each received within an associated one of said bores, each valve end and its associated bore define therebetween second and third annular chambers of respective second and third predetermined radial dimensions, said second and third predetermined radial dimensions being at least as great as said first predetermined radial dimension, the lower one of said valve ends projects outwardly of said valve housing through its associated bore, said valve being mounted for independent movement within said valve housing, and said lower valve end being in contact with said rod end whereby dependent upon the weight of water in said cup said valve means will be displaced to pass through said chambers any particle of a size sufficient to enter said valve housing through said second annular chamber.

19. The water fountain is defined in claim 1 wherein said stepwise axially adjusting means is defined by a plurality of axially spaced circumferentially offset lands on said sleeve and a radially directed lug on said support member.

20. The water fountain as defined in claim 19 wherein said circumferentially offset lands define therebetween a plurality of valleys of sufficient axial depth to permit axial movement of said rod to operate said valve means without disengagement between said lug and its associated valley.

21. In a water fountain assembly of the type including a tubular support member having an axial opening therein and first and second opposite end portions adapted for respectively movably supporting a valve regulated water cup assembly and coupling said support member to a water pipe, the improvement comprising means for coupling said second end portion to a water pipe, said coupling means includes a radially outwardly directed projection carried by said second end portion, an annular wall of said second end portion axially spaced from and facing said projection, a sleeve adapted for connection to a water pipe, said sleeve having axially oppositely facing annular walls, a first wall of said sleeve being in opposed relationship to the second wall of said second end portion, said projection resting atop a second wall of said sleeve, and said sleeve second wall being defined by alternating peaks and valleys inclined circumferentially of said sleeve whereby upon relative rotation of said sleeve and support member the same are moved axially to tighten or loosen the coupling from therebetween.

22. The improvement in the water fountain assembly as defined in claim 21 including gasket means between said sleeve first wall and said second end portion second wall which is compressed or relaxed upon respective tightening and loosening of the coupling force.

23. The improvement in the water fountain assembly as defined in claim 21 including an axially extending radially inwardly opening slot between the annular walls thereof to effect the passage therethrough of said projection for coupling and uncoupling said support member and sleeve.

24. The improvement in the water fountain assembly as defined in claim 22 including an axially extending radially inwardly opening slot between the annular walls thereof to effect the passage therethrough of said projection for coupling and uncoupling said support member and sleeve.

25. A water fountain comprising a support member adapted to be suspendingly supported in a generally upright position, as axial opening in at least one end portion of said support member, valve means in said opening controlling the flow of water therethrough, a cup assembly carried by said support member, said cup assembly carried by said support member, said cup assembly includes a cup for receiving water which flows past said valve means, means for supporting said cup assembly relative to said support member, said supporting means including a rod which is joined to said cup, means for biasing an end of the rod against said valve means for operating said valve means in response to the weight of water in said cup, said valve means having axially opposite valve portions in axially opposed relationship to associated valve seats, a first of said valve portions and its associated valve seat being closed by the weight of water overcoming the biasing force of said biasing means, a second valve portion and its associated valve seat being closed by excessive unweighting of said cup, a sleeve telescopically receiving said rod, means between said sleeve and said support member for axially stepwise adjusting said sleeve relative to said rod whereby the force of the biasing means may be regulated to correspondingly vary the operation of said valve means for desired different weights of water in said cup, and said biasing means further biases said sleeve into axial engagement with said stepwise adjusting means of said support member.

* * * * *

UNITED STATES PATENT OFFICE
CERTIFICATE OF CORRECTION

Patent No. 3,804,068  -  Dated April 16, 1974

Inventor(s) Frederick W. Steudler, Jr.

It is certified that error appears in the above-identified patent and that said Letters Patent are hereby corrected as shown below:

The term of this patent subsequent to

May 1, 1990, has been disclaimed.

Signed and Sealed this ninth Day of December 1975

[SEAL]

Attest:

RUTH C. MASON
*Attesting Officer*

C. MARSHALL DANN
*Commissioner of Patents and Trademarks*